(12) United States Patent
Jin et al.

(10) Patent No.: US 11,804,730 B2
(45) Date of Patent: Oct. 31, 2023

(54) ENERGY STORAGE SYSTEM AND POWER SUPPLY METHOD THEREOF

(71) Applicant: Shanghai Baizhu Chenghang New Energy Co., Ltd., Shanghai (CN)

(72) Inventors: Hongyuan Jin, Shanghai (CN); Chang She, Shanghai (CN); Degang Yi, Shanghai (CN)

(73) Assignee: SHANGHAI BAIZHU CHENGHANG NEW ENERGY CO., LTD., Shanghai (CN)

( * ) Notice: Subject to any disclaimer, the term of this patent is extended or adjusted under 35 U.S.C. 154(b) by 0 days.

(21) Appl. No.: 18/089,654

(22) Filed: Dec. 28, 2022

(65) Prior Publication Data

US 2023/0216335 A1 Jul. 6, 2023

(30) Foreign Application Priority Data

Dec. 31, 2021 (CN) .......................... 202111669787.7
Apr. 19, 2022 (CN) .......................... 202210412522.7

(51) Int. Cl.
*H02J 9/06* (2006.01)
*H02J 7/00* (2006.01)

(52) U.S. Cl.
CPC ............ *H02J 9/061* (2013.01); *H02J 7/0013* (2013.01); *H02J 7/0063* (2013.01); *H02J 7/0068* (2013.01)

(58) Field of Classification Search
CPC ...... H02J 7/0068; H02J 7/0063; H02J 7/0013; H02J 9/061

USPC ........................................................... 307/66
See application file for complete search history.

(56) References Cited

U.S. PATENT DOCUMENTS

| | | | |
|---|---|---|---|
| 8,242,750 B2 * | 8/2012 | Li ........................ | G05B 15/02 307/64 |
| 2017/0126054 A1 * | 5/2017 | White .................... | H02M 7/44 |

FOREIGN PATENT DOCUMENTS

| | | |
|---|---|---|
| CN | 111146860 A | 5/2020 |
| CN | 210941434 U | 7/2020 |
| CN | 112886696 A | 6/2021 |
| WO | 2010060338 A1 | 6/2010 |

* cited by examiner

*Primary Examiner* — Michael R. Fin
(74) *Attorney, Agent, or Firm* — IPRO, PLLC; Na Xu

(57) ABSTRACT

A energy storage system includes a power supply device, a main battery and a backup battery, and a power supply method of the energy storage system includes: when the power supply device works normally, a load is powered and the backup battery is floatingly charged by the power supply device, and the main battery is in standby mode; when the power supply device stops supplying power, the load will be powered by the backup battery, and meanwhile, the main battery will be triggered to switch from the standby mode to a backup mode to start supplying power to the load; when an output power of the main battery is equal to a power of the load, an output power of the backup battery is zero and the backup battery is in a bypass state.

13 Claims, 7 Drawing Sheets

ENERGY STORAGE SYSTEM AND POWER SUPPLY METHOD THEREOF

CROSS-REFERENCE TO RELATED APPLICATIONS

This application is based upon and claims priority to Chinese Patent Application No. 202210412522.7, filed with the Chinese Patent Office on Apr. 19, 2022, titled "Energy storage system and power supply method thereof", the entire contents of which are incorporated herein by reference.

TECHNICAL FIELD

The present application relates to the technical field of power supply, and in particular, relates to an energy storage system and a power supply method thereof.

BACKGROUND

In order to ensure the normal operation of the data center at time of power failure of the power grid, the data center needs to be equipped with an energy storage system. With the explosive growth of global Internet big data, higher requirements have been imposed on the efficiency, power density and reliability of batteries in the energy storage system.

SUMMARY

In a first aspect, a technical solution adopted by an embodiment of the present application is to provide a power supply method for an energy storage system, wherein the energy storage system includes a power supply device for supplying power to a DC bus, and a main battery and a backup battery connected to the DC bus in parallel, and the power supply method includes:
  when the power supply device works normally, a load is powered and the backup battery is floatingly charged by the power supply device, and the main battery is in standby mode;
  when the power supply device stops supplying power, the load will be powered by the backup battery, and meanwhile, the main battery will be triggered to switch from the standby mode to a backup mode to start supplying power to the load;
  when the output power of the main battery is equal to the power of the load, the output power of the backup battery is zero and the backup battery is in a bypass state;
  when the maximum output power of the main battery is less than the power of the load, the load is powered by the main battery and the backup battery;
  when the power supply device resumes, the load is powered by the power supply device together with the main battery, and meanwhile, the backup battery is charged by the power supply device and the main battery;
  when the voltage of the DC bus is higher than a rated working voltage, the load will be powered by the power supply device, and meanwhile, the backup battery and the main battery are charged by the power supply device.

In a second aspect, an embodiment of the present application provides an energy storage system, which includes a power supply device for supplying power to a DC bus, and a main battery and a backup battery connected to the DC bus in parallel;
  when the power supply device works normally, a load is powered and the backup battery is floatingly charged by the power supply device, and the main battery is in standby mode;
  when the power supply device stops supplying power, the backup battery will be configured to supply power to the load, and meanwhile, the main battery will be switched from the standby mode to a backup mode to start supplying power to the load;
  when the output power of the main battery is equal to the power of the load, the output power of the backup battery is zero and the backup battery is in a bypass state;
  when the maximum output power of the main battery is less than the power of the load, the backup battery and the main battery together supply power to the load;
  when the power supply device resumes, the power supply device and the main battery together supply power to the load, and meanwhile, the backup battery is charged by the power supply device and the main battery;
  when the voltage of the DC bus is higher than the rated working voltage, the power supply device supplies power to the load, and meanwhile, the backup battery and the main battery are charged by the power supply device.

As compared to the prior art, the energy storage system of the embodiments of the present application includes a main battery and a backup battery connected to the DC bus in parallel. When the power supply device works normally, the power supply device supplies power to the load, and at the same time, the backup battery is floatingly charged by the power supply device, and the main battery is in a standby mode. When the power supply device stops supplying power, the backup battery supplies power to the load, and meanwhile, the main battery is triggered to switch from the standby mode to a backup mode to start supplying power to the load. When the output power of the main battery is equal to the power of the load, the output power of the backup battery is zero and the backup battery is in a bypass state. In this way, the battery having high-rate discharge characteristics may be selected as the backup battery, and the battery with high energy density and high cycle performance may be selected as the main battery, thereby improving the energy density, safety and reliability of the energy storage system.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention and are not intended to be limiting. The accompanying drawings are not intended to be drawn to scale. In the drawings, each identical or nearly identical component that is illustrated in various FIGS. is represented by a like numeral. In the drawings.

DETAILED DESCRIPTION

Technical solutions in the embodiments of the present application will be described below with reference to the attached drawings. Obviously, the embodiments described are only part but not all of the embodiments of the present application. Based on the embodiments of the present application, all other embodiments obtained by those of ordinary skill in the art without creative labor shall fall within the scope claimed in the present application.

Unless otherwise defined, all technical and scientific terms used in this specification have the same meanings as commonly understood by those skilled in the art of the present application. The terms used in the specification of the present application are only used for the purpose of describing specific embodiments, and are not intended to limit the present application. The term "and/or" used in this specification includes any and all combinations of one or more related items listed.

In the prior art, Lithium-ion batteries or other new batteries have been widely used in various industries gradually due to the high energy density and long cycle life thereof. However, the safety and high-rate discharge characteristics of the lithium-ion batteries or other new batteries are insufficient, which limits their application in energy storage systems with higher requirements for standby safety. Lead-acid batteries with higher safety but lower energy density are still mainly used as backup batteries, and this has become a major bottleneck to improve the power density of batteries for the data center. Moreover, the low cycle life of lead-acid batteries leads to frequent maintenance of the energy storage system in the later period and cost increase.

Figure 1:
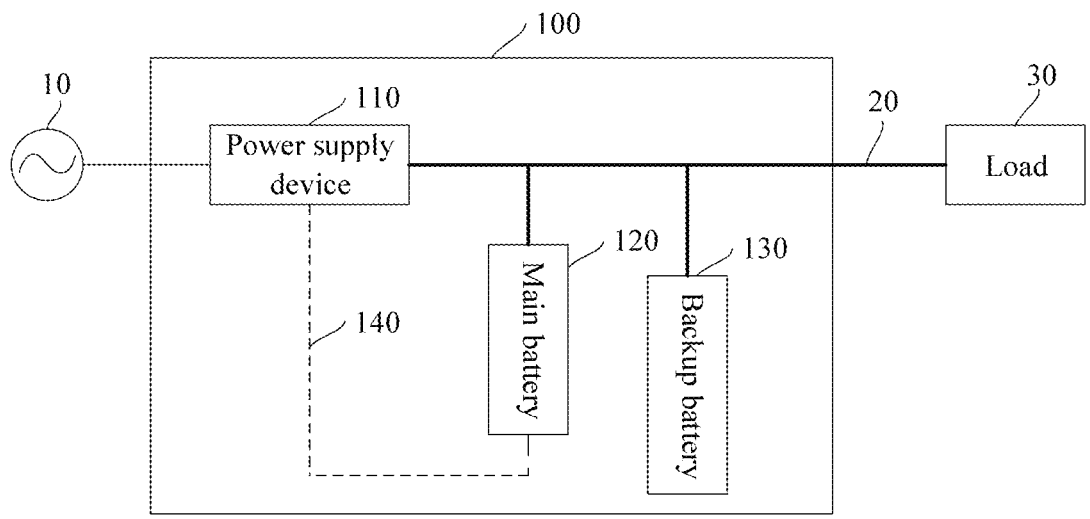
FIG. 1 is a schematic view of an energy storage system according to an embodiment of the present application.

In order to simultaneously improve the energy density, safety and reliability of an energy storage system, Aspects in accord with the present invention are directed to an energy storage system and a power supply method thereof, wherein the energy storage system includes two types of energy storage batteries. FIG. 1 is a schematic view of an energy storage system 100 according to aspects described herein. The energy storage system 100 includes a power supply device 110, a main battery 120 and a backup battery 130. An input terminal of the power supply device 110 is connected to an AC power grid 10, and an output terminal of the power supply device 110 is connected to a DC bus 20. The power supply device 110 is used for converting the electric energy of the AC power grid 10 into a specific DC voltage and supplying power to the DC bus 20. The main battery 120 and the backup battery 130 are connected to the DC bus 20 in parallel. When the AC power grid 10 is failed and/or the power supply device 110 has broken down (which are collectively referred to as the power failure of the power supply device 110 hereinafter), the main battery 120 and the backup battery 130 are used to supply power to the DC bus 20 so as to maintain the normal operation of a load 30 on the DC bus 20.

The load 30 can be diversifed according to the practical application. For example, when the energy storage system 100 is applied to a data center, the load 30 is an IT equipment, and when the energy storage system 100 is applied to a communication base station, the load 30 is a communication equipment.

The energy storage system 100 further includes a communication link 140, which is used to realize communication between the power supply device 110 and the main battery 120. For example, a first communication interface may be provided on the power supply device 110 and the main battery 120 respectively, and the communication link 140 is established by connecting the first communication interfaces of the power supply device 110 and the main battery 120 through an communication cable. For another example, a wireless communication module may be provided on the power supply device 110 and the main battery 120 respectively, and the communication link 140 is established through communication between the wireless communication modules. In practical application, the power supply device 110 and/or the main battery 120 may also communicate with external equipment through the first communication interface or wireless communication module thereof.

According to different working states of the main battery 120, the working modes of the main battery 120 include a standby mode and a backup mode. When the power supply device 110 is operating normally, that is when the voltage of the DC bus 20 is at the rated value, the main battery 120 is in a standby mode, in which there is no energy interaction between the main battery 120 and the DC bus 20, that is, the main battery 120 is in a standby mode. Only when the main battery 120 detects that the state of charge (SOC) thereof (i.e., a ratio of the remaining capacity to the capacity thereof at a fully charged state) is lower than a threshold due to Self-discharge, the main battery 120 obtains power from the DC bus 20 to recharge.

When abnormal working conditions occur, the main battery 120 is switched from the standby mode to the backup mode in which the main battery 120 outputs power to the DC bus 20 to supply power to the load 30. The abnormal working conditions include but not limited to: a) When the communication with the power supply device 110 is normal, it is detected that the voltage of the DC bus 20 is lower than a preset trigger voltage, wherein the preset trigger voltage may be a specific value or a percentage of the output voltage of the power supply device 110, and the output voltage of the power supply device 110 can be obtained through communication with the power supply device 110; b) The communication with the power supply device 110 is abnormal, for example, the communication with the power supply device 110 is lost, or a signal of abnormal state of the power supply device 110 is received through the communication link 140; c) A forced switching command issued by the power supply device 110 is received through the communication link 140.

The backup battery 130 is directly connected to the DC bus 20. When the power supply device 110 is operating normally, the backup battery 130 is in a float charge state. At the moment of an abnormal working condition, the main battery 120 switched to backup mode has not yet output power, and the backup battery 130 plays a role of maintaining the voltage of the DC bus 20. As the output power of the main battery 120 gradually increases, correspondingly, the output power of the backup battery 130 gradually decreases to 0. When the output power of the backup battery 130 is 0, the backup battery 130 is in a bypass state, and the energy of the energy storage system 100 is provided by the main battery 120.

When the maximum output power of the main battery 120 is smaller than the load power of the load 30 due to the decrease of the output power of the main battery 120 or the increase of the power of the load 30, the backup battery 130 participates in power supply. With the further power consumption of the main battery 120 and the backup battery 130, the whole energy storage system 100 shuts down when the voltage of the backup battery 130 drops to the discharging cut-off voltage thereof.

When the power supply device 110 resumes, the power supply device 110 and the main battery 120 (if the main battery 120 still has power) supply power to the load 30, and meanwhile, the backup battery 130 is also charged by the power supply device 110 and the main battery 120 as the voltage of the DC bus 20 has not yet risen to the rated working voltage (i.e., the float charging voltage of the backup battery 130). As the voltage of the DC bus 20 rises, when the voltage of the DC bus 20 is higher than the rated working voltage, the power supply device 110 starts to charge the main battery 120, until both the main battery 120 and the backup battery 130 are fully charged, then the voltage of the DC bus 20 drops to the rated working voltage. When the voltage of the DC bus 20 drops to the rated working voltage, the main battery 120 returns to the standby mode, and the backup battery 130 is in the float charge state again.

From power failure to resumption of normal power supply of the power supply device 110, the specific working process of the energy storage system 100 is as follows.

Figure 2A:
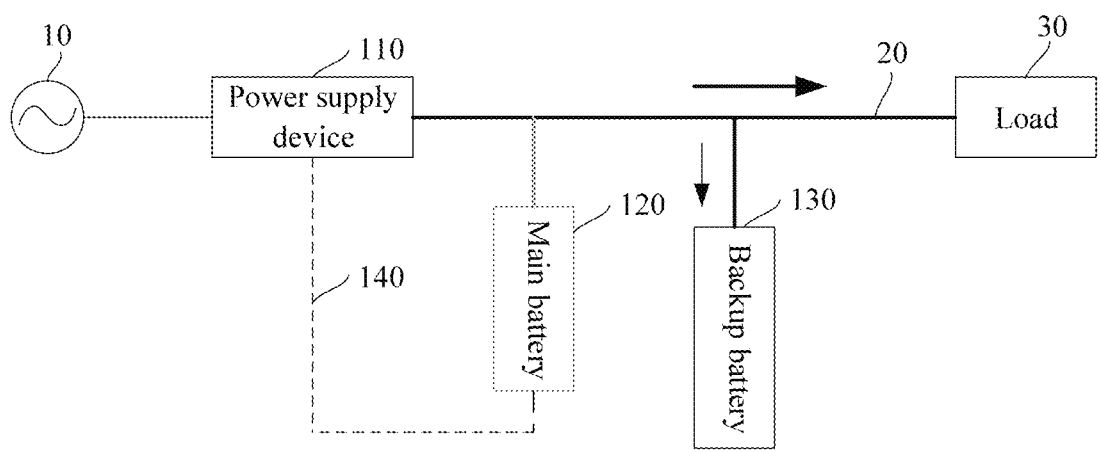
FIG. 2A to FIG. 2F are schematic views illustrating operations of components of the energy storage system from power failure to power supply resumption of a power supply device according to an embodiment of the present application.
Figure 3:
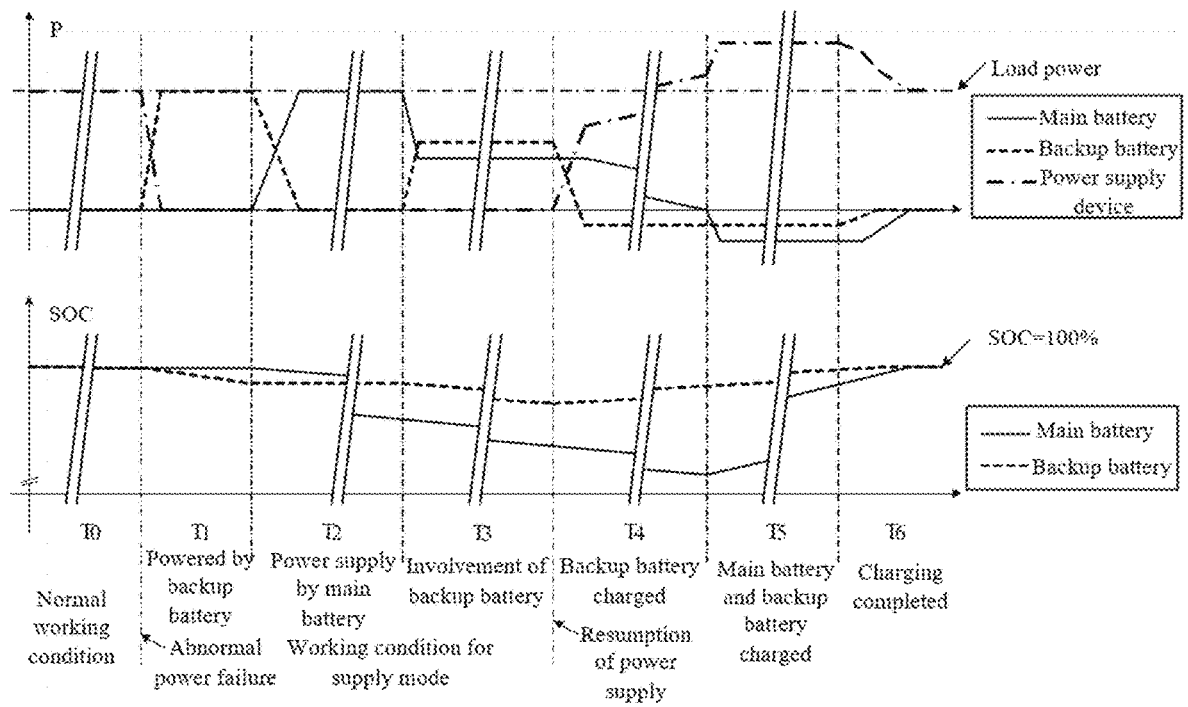
FIG. 3 is a schematic view illustrating changes of output power and SOC of components of the energy storage system from power failure to resumption of the power supply device according to the embodiment of the present application.

Referring to FIG. 2A and FIG. 3 together, during T0 period, the power supply device 110 supplies power to the load 30 as the power supply device 110 works normally, and meanwhile, the backup battery 130 is floatingly charged by the power supply device 110, the main battery 120 is in a standby mode with an output power of 0; and at this time, the SOC of the main battery 120 and the SOC of the backup battery 130 are both about 100%.

Figure 2B:
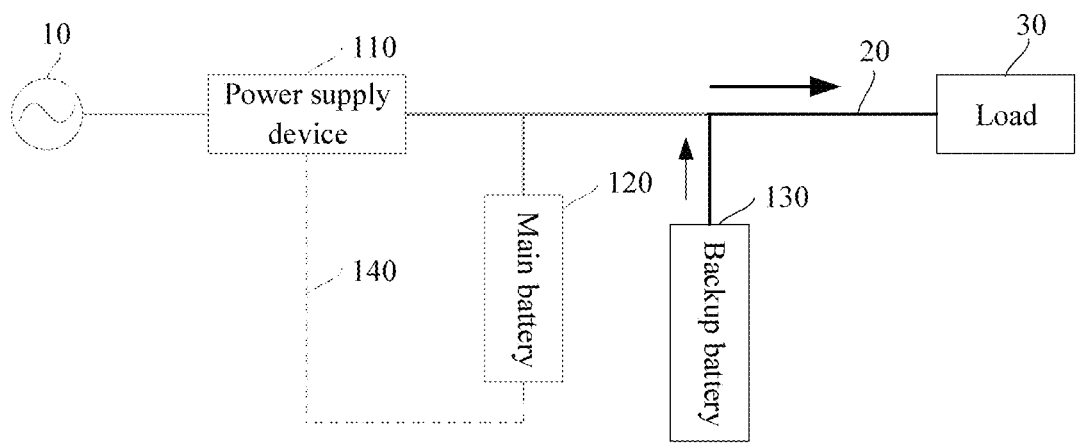

Referring to FIG. 2B and FIG. 3 together, during T1 period, when the power supply device 110 is abnormal and stops supplying power, the voltage of the DC bus 20 is maintained by the backup battery 130. Due to the internal resistance of the battery and cable, the voltage of the DC bus 20 drops to a lower value the rated working voltage, then the main battery 120 is switched from the standby mode to the backup mode but has not yet output power. In this case, the communication link 140 between the main battery 120 and the power supply device 110 may continue being connected or disconnected; the backup battery 130 works with full load. In this period the SOC of the main battery 120 remains, and the SOC of the backup battery 130 decreases at a high rate, which lasts for tens of seconds.

Figure 2C:
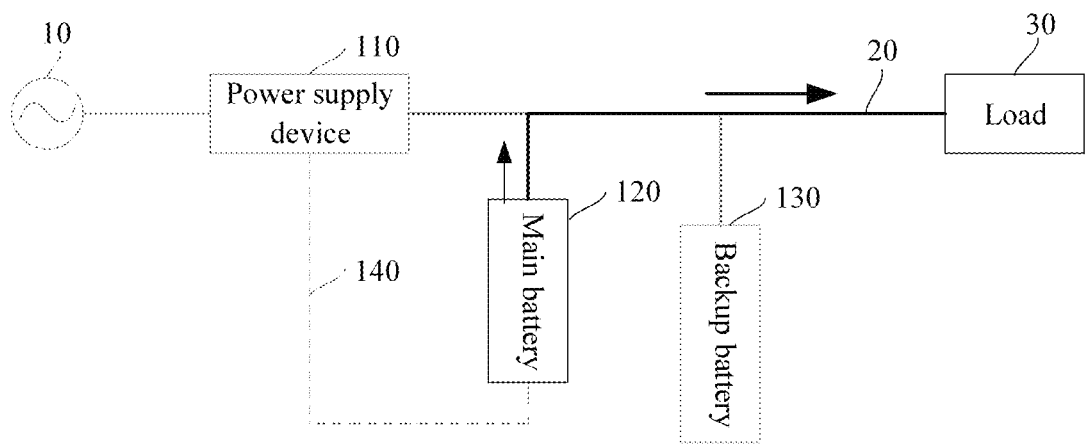

Referring to FIG. 2C and FIG. 3 together, during the $T_2$ period, the output power of the main battery 120 gradually increases until a dynamic balance between it and the power of the load 30 is reached. Correspondingly, the output power of the backup battery 130 gradually decreases to 0, and when the output power of the backup battery 130 is 0, the backup battery 130 is in a bypass state. In this period the SOC of the main battery 120 starts to decrease, and the SOC of the backup battery 130 may be regarded as stable.

Figure 2D:
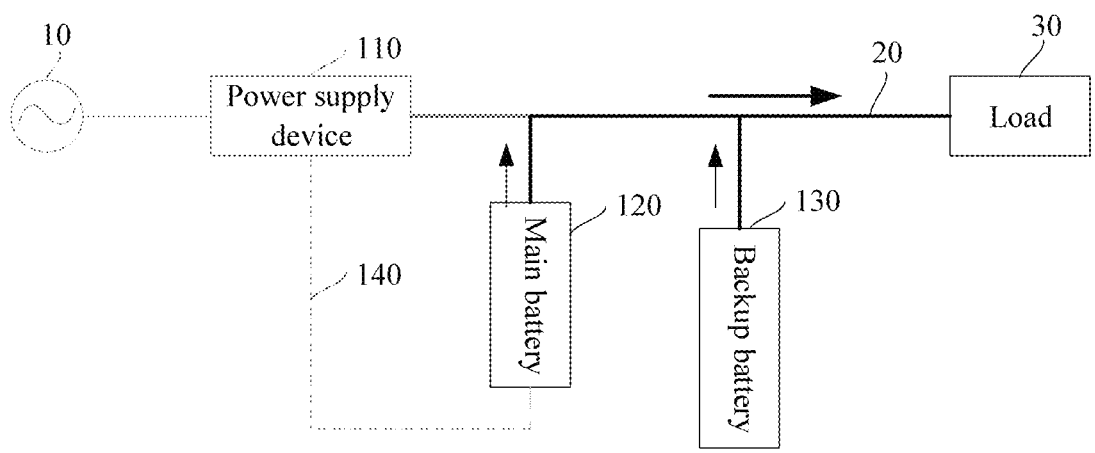

Referring to FIG. 2D and FIG. 3 together, during T3 period, as the SOC of some battery modules of the main battery 120 drops to 0, these battery modules are withdrew from power supply, and the maximum output power of the main battery 120 decreases. When the maximum output power of the main battery 120 is less than the power of the load 30, the backup battery 130 participates in the power supply. In this period the SOC of the main battery 120 and the SOC of the backup battery 130 continue to decrease.

Figure 2E:
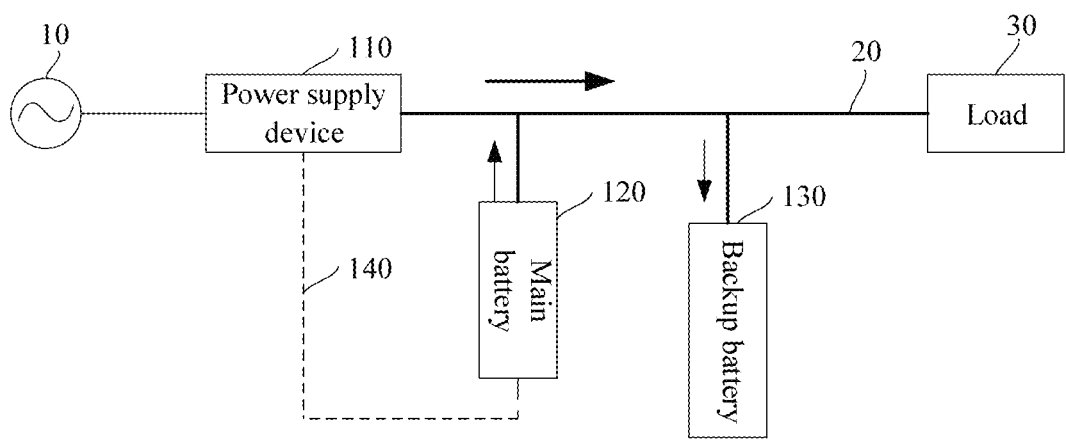

Referring to FIG. 2E and FIG. 3 together, in T4 period, after the power supply device 110 resumes, since the voltage of the DC bus 20 has not recovered to the rated working voltage, the main battery 120 keeps outputting power until the voltage of the DC bus 20 rises to the rated working voltage. The backup battery 130 and the load 30 are powered by the power supply device 110 and the main battery 120. At this stage, the SOC of the backup battery 130 increases while the SOC of the main battery 120 continues decreasing.

Figure 2F:
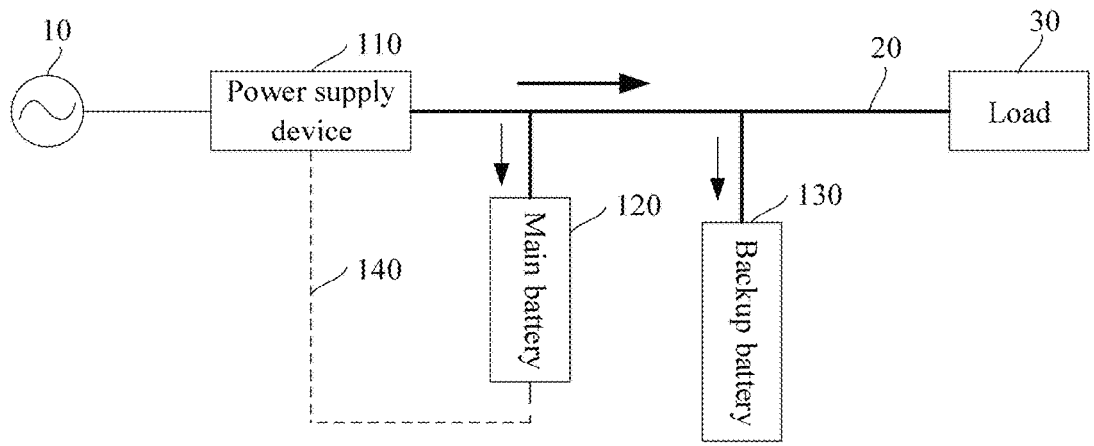

Referring to FIG. 2F and FIG. 3 together, during T5 period, as the voltage of the DC bus 20 is further increased to be higher than the rated working voltage, the main battery 120 starts to be charged, and the power supply device 110 supplies power to the load 30, the main battery 120 and the backup battery 130 at the same time. The SOC of the main battery 120 and the SOC of the backup battery 130 both rise due to being charged.

During T6 period, as the SOC of the main battery 120 and the SOC of the backup battery 130 continue rising, after the charging of the backup battery 130 and the main battery 120 has been completed, the voltage of the DC bus 20 drops back to the rated working voltage, as shown in FIG. 2A, the power supply device 110 supplies power to the load 30, and meanwhile, the backup battery 130 is floatingly charged by the power supply device 110, and the main battery 120 is kept in the standby mode again.

In practical application, a battery with high-rate discharge characteristics or a supercapacitor may be selected as the backup battery 130, which plays a role of maintaining the voltage of the DC bus 20 as soon as abnormality occurs. A battery with high energy density and high cycle performance is selected as the main battery 120. During the power failure of the power supply device 110, the power is mainly supplied by the main battery 120. Even if all the battery modules in the main battery 120 fail, the load 130 can still be powered by the backup battery 130. In this way, the energy density, safety and reliability of the energy storage system are improved.

In an embodiment, the main battery 120 is a lithium-ion battery or a nickel-based battery, and the backup battery 130 is a Valve Regulated Lead-acid Battery (VRLA Battery for short). The lithium-ion battery or nickel-based battery has advantages of high energy density and long cycle life or the like, while the VRLA Battery has advantages of high-rate discharge characteristics, high safety, low cost, or the like. By using the lithium-ion battery or nickel-based battery as the main battery 120, the energy density of the energy storage system is improved, and the times of cycle of backup battery is significantly reduced, which is friendly with VRLA and any rechargeable battery.

In an embodiment, the working mode of the main battery 120 further includes a scheduling mode in which the main battery 120 may receive a scheduling command issued by the power supply device 110 through the communication link 140, and after receiving the scheduling command, the main battery 120 is switched from the standby mode to the scheduling mode. In the scheduling mode, the voltage of the DC bus 20 is controlled by the power supply device 110, float charge state and the main battery 120 is charged/discharged according to the scheduling command.

The scheduling command includes any two of the following: a target SOC value, a target charging/discharging rate, and a target charging/discharging time.

For example, if the scheduling command includes a target SOC value and a target charging/discharging rate, then the main battery 120 is charged/discharged at the target charging/discharging rate described above and is switched to the standby mode after reaching the target SOC value.

For example, if the scheduling command includes a target SOC value and a target charging/discharging time, then the main battery 120 operates with a charging/discharging rate calculated from dividing the (transient SOC−target SOC value) by the target charging/discharging time, and it is switched to the standby mode after reaching the target SOC value.

For example, if the scheduling command includes a target charging/discharging rate and a target charging/discharging time, then the main battery 120 is charged/discharged at the target charging/discharging rate described above and timing is started, and the main battery 120 is switched to the standby mode after the timing reaches the target charging/discharging time.

The energy storage system 100 can perform energy management to generate economic benefits by sending scheduling commands to the main battery 120 from the power supply device 110. Specifically, during the peak period of electricity price, the power supply device 110 sends a discharging command to the main battery 120, wherein the discharging command includes any two of the following: a target SOC value, a target discharging rate, and a target discharging time, so that the main battery 120 can be discharged according to the above discharging command to reduce the output power of the power supply device 110. During the valley period of electricity price, the power supply device 110 sends a charging command to the main battery 120, wherein the charging command includes any two of the following: a target SOC value, a target charging rate, and a target charging time, so that the main battery 120 can be charged according to the above charging command to prepare for discharging during the peak period of electricity price.

Similarly, when abnormal working conditions occur, the main battery 120 may also be switched from the scheduling mode to the backup mode. The abnormal working conditions include, but not limited to: a) When the communication with the power supply device 110 is normal, it is detected that the voltage of the DC bus 20 is lower than a preset trigger voltage, wherein the preset trigger voltage may be a specific value or a percentage of the output voltage of the power supply device 110, and the output voltage of the power supply device 110 can be obtained through communication with the power supply device 110; b) The communication with the power supply device 110 is abnormal, for example, the communication with the power supply device 110 is lost, or a signal of abnormal operation of the power supply device 110 is received through the communication link 140; c) A forced switching command from the power supply device 110 is received through the communication link 140.

Figure 4:
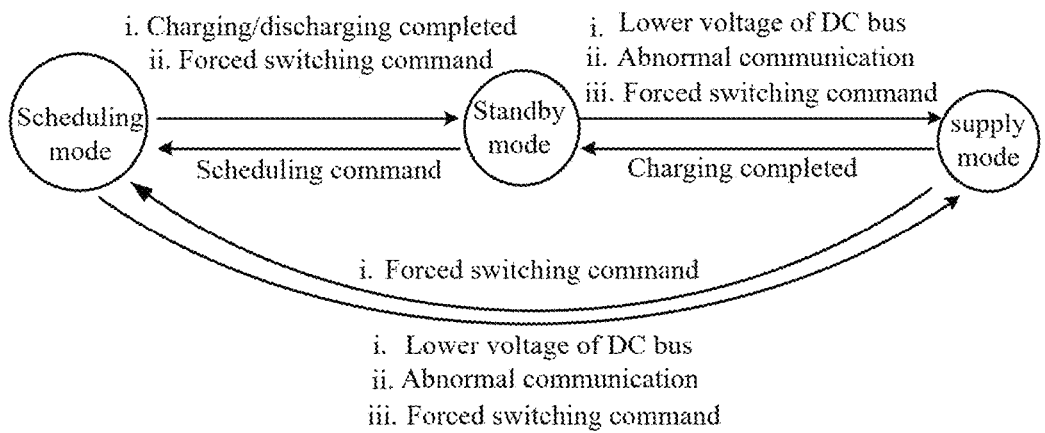
FIG. 4 is a schematic view illustrating the switch among three modes of the main battery according to an embodiment of the present application.

FIG. 4 shows the state switching of the main battery 120 among the standby mode, the scheduling mode and the backup mode. the main battery 120 is in the standby mode by default as the power supply device 110 works normally, and when an abnormal working condition occurs, the main battery 120 is switched from the standby mode to the backup mode. When a scheduling command is received, the main battery 120 is switched from the standby mode to the scheduling mode. In the scheduling mode, when an abnormal working condition occurs, the main battery 120 is switched from the scheduling mode to the backup mode again.

Figure 5:
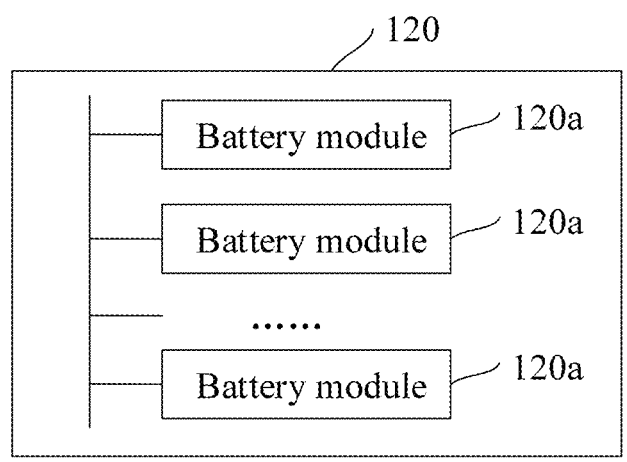
FIG. 5 is a schematic view of a main battery of an energy storage system according to an embodiment of the present application.
Figure 6:
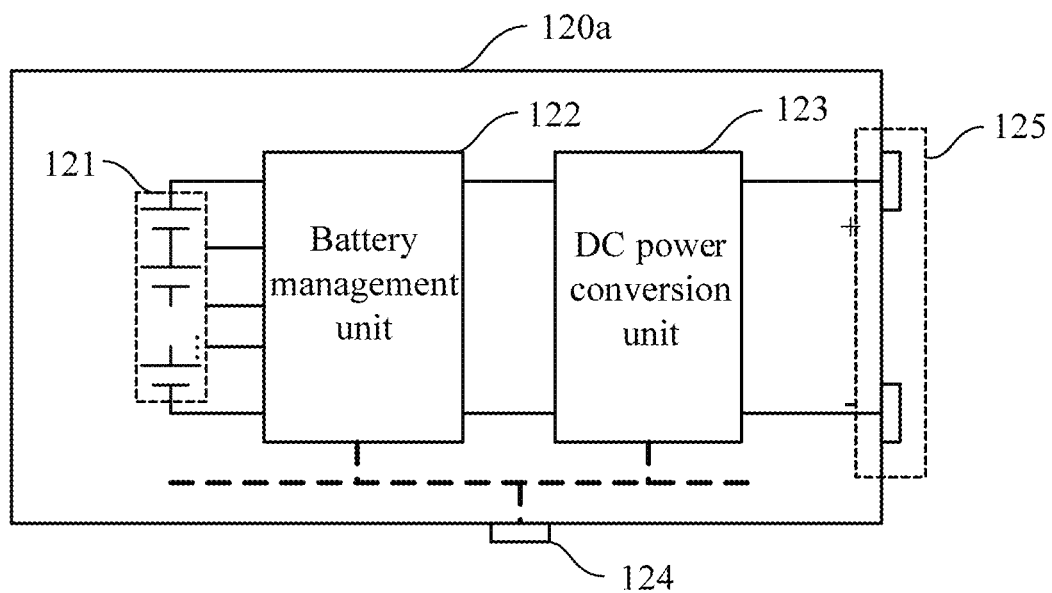
FIG. 6 is a schematic view of a battery module of a main battery according to an embodiment of the present application.

Embodiments of the present application further provide a specific embodiment of the main battery 120 of the energy storage system 100 described above. As shown in FIG. 5 and FIG. 6, the main battery 120 in this embodiment includes a plurality of battery modules 120a, and each battery modules 120a includes cells unit 121, a battery management unit 122, a DC power conversion unit 123 and a second communication interface 124. One terminal of the battery management unit 122 is connected to cells unit 121, and the other terminal of the battery management unit 122 is connected to the DC power conversion unit 123. Both the battery management unit 122 and the DC power conversion unit 123 are connected to the second communication interface 124, meanwhile, the remaining battery modules 120a communicate with each other through the second communication interface 124.

As shall be appreciated, the functional modules described above are only provided for illustrative purpose, and the modules described as separate components may or may not be physically separated. For example, the second communication interface 124 and the above-mentioned first communication interface used to communicate with the power supply device 110 may be one communication interface physically, and the terms first communication interface and the second communication interface 124 in this embodiment are only used for functional distinction. In another embodiment, the second communication interface 124 may be integrated with the DC power conversion unit 123 on the same chip.

The power output terminal of the DC power conversion unit 123 serves as an external DC power interface 125 of the battery module 120a. The DC power interface 125 is connected to the DC power interfaces 125 of the remaining battery modules 120a in parallel, and the paralleled interfaces are connected to the DC bus 20 in parallel.

The battery management unit 122 is used for monitoring and managing a plurality of cells in cells unit 121. Specifically, the battery management unit 122 mainly has functions as follows: monitoring the voltage and temperature of each cell; acquiring and calculating the total voltage, total current, SOC and other information of cells unit 121; protecting cells unit 121 and/or each cell from over-voltage, over-current, high and low temperature or the like; and balancing the cell with excessive energy or the like. The above-mentioned technology belongs to the prior art, and it is within the scope easily appreciated by those skilled in the art, and thus will not be further described herein.

Figure 7:
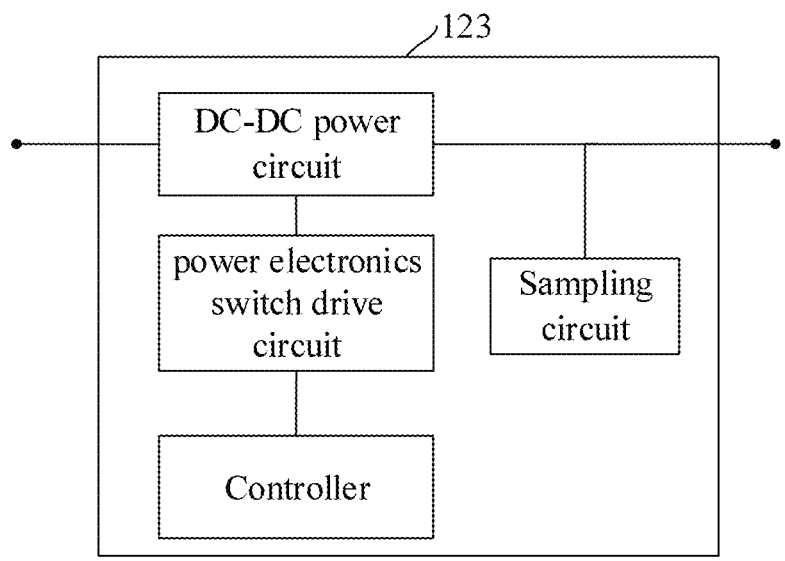
FIG. 7 is a schematic view of a DC power conversion unit of the battery module according to the embodiment of the present application.

As shown in FIG. 7, the DC power conversion unit 123 includes a DC-DC power circuit, a controller, a sampling circuit, and a power electronics switch drive circuit. The power input terminal of the DC-DC power circuit is connected to the power output terminal of cells unit 121 or the battery management unit 122, and the power output terminal of the DC-DC power circuit is paralleled with the power output terminals of the DC-DC power circuits in the remaining battery modules 120a. The DC-DC power circuit may be any common power electronics topology of bi-directional DC-DC converters, such as Buck-Boost, DAB, LLC-SRC, CLLC and other circuit topologies.

The sampling circuit connected to the DC-DC power circuit is used for collecting the voltage and current of the DC-DC power circuit. The controller acquires the transient SOC values of all the battery modules 120a through the second communication interface 124, and acquires the current of the battery module 120a through the corresponding sampling circuit, and according to the acquired transient SOC values of all the battery modules 120a and the current of the battery module 120a in which it is located, determines a working voltage of the battery module in which it is located by calculating the working voltage reference.

When the working voltage reference is higher than a lower limit voltage, the controller enables the power electronics switch drive circuit according to the working voltage so as to make the DC-DC power circuit work, thereby controls the output voltage of the battery module 120a in which it is located to be the working voltage reference value. When the working voltage reference is lower than the lower limit voltage, the controller enables the power electronics switch drive circuit according to the lower limit voltage so as to control the voltage output of the battery module 120a in which it is located to be the lower limit voltage value.

Figure 8:
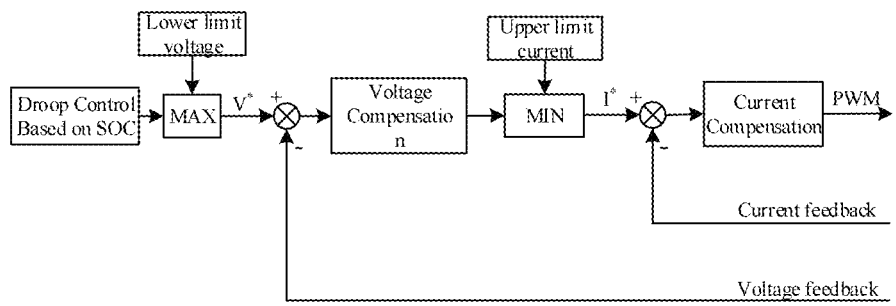
FIG. 8 is a control block diagram of a controller of the DC power conversion unit according to the embodiment of the present application.

The control logic of the controller is as shown in FIG. 8. First, according to the transient SOC values of all the battery modules 120a and the current of the battery module 120a in which it is located, the controller calculates the working voltage reference of the battery module 120a in which it is located, compares the working voltage reference with the lower limit voltage, then selects the larger value as the voltage reference of the voltage loop. A difference between the voltage reference and a feedback voltage is input into the voltage loop to be adjusted then a current reference is output. Then, the smaller one of the current reference and an upper limit current is selected to be compared with a feedback current, the difference of which is input into the current loop to be adjusted then a corresponding driving signal is output to enable the power electronics switch drive circuit.

The implementation carrier of the controller is any kind of control chip with programmable function that meet the peripheral resources required by the circuit operation. This embodiment takes a DSP chip as an example for description. The DSP chip samples and collects the electrical parameters (such as voltage and current) of DC-DC power circuit through an analog-to-digital converter (ADC), and collects the electrical parameters (such as the transient SOC value) of other battery modules through the communication interface (eCAN, UART, etc.) thereof, the information is processed by the on-chip CPU to finally generate control signals. The control signals are output by ePWM to control the power electronics switch in the inverter circuit and rectifier circuit of the DC-DC power circuit by the power electronics switch drive circuit, thereby controlling the battery module 120a in which it is located to output a specific voltage.

The controller can make the battery module 120a in which it is located performs output with a droop characteristic related to the battery SOC which enables the plurality of battery modules 120a to be paralleled and operated in the DC bus 20 without affecting the stability of the system. By introducing the battery SOC information, the plurality of battery modules 120a can adjust the SOC thereof to achieve dynamic balance among the battery modules 120a during operation.

In an embodiment, the controller determines the working voltage of the battery module 120a in which it is located according to the transient SOC values of all the battery modules 120a and the current of the battery module 120a in which it is located specifically includes:

1) determining the balance control coefficient $K_{SOC}$ of the battery module 120a in which it is located according to the transient SOC values of all the battery modules 120a, wherein the balance control coefficient $K_{SOC}$ is negatively correlated with the transient SOC value when the main battery 120 supplies power, and negatively correlated with (1−transient SOC value) when the main battery 120 is charged.

For example, when the main battery 120 supplies power, a ratio coefficient $k_i = \overline{SOC}/SOC_i$ of the battery module 120a in which the controller is located is calculated first, wherein $\overline{SOC}$ is the average of the transient SOC values of all the battery modules 120a, and $SOC_i$, is the transient SOC value of the current battery module 120a; then, the balance control coefficient $K_{SOCi} = K \cdot k_i$, of the battery module 120a in which the controller is located is calculated according to the preset coefficient K.

When the main battery 120 is charged, a ratio coefficient $k_i = \overline{(1-SOC)}/(1-SOC_i)$ of the battery module 120a in which the controller is located is calculated first, wherein $\overline{1-SOC}$ is the average of (1−transient SOC value) of all the battery modules 120a, and $(1-SOC_i)$ is the value of (1−transient SOC value) of the current battery module 120a. Then, the balance control coefficient $K_{SOCi} = K \cdot k_i$, of the battery module 120a in which the controller is located is calculated according to the preset coefficient K.

The preset coefficient K may be taken as $K = \Delta V_{max}/I_{max}$, wherein $\Delta V_{max}$ is the maximum acceptable voltage drop or voltage rise of the energy storage system 100 in a full range of working conditions, and correspondingly, $I_{max}$ is the maximum charge-discharge current of the battery module 120a.

In some other embodiments, when there is a higher requirement for the balance speed, a power exponent may be introduced to increase the balance difference of SOC values, and in this case, the ratio coefficient of the balance control coefficient $k_i = \overline{(SOC)^m}/SOC_i^m$ or the ratio coefficient $k_i = \overline{(1-SOC)^m}/(1-SOC_i)^m$, wherein m≥1.

2) the working voltage reference of the battery module 120a where the controller is located is calculated according to the formula: $V_i = V_{NOR+} - K_{SOCi} \cdot I_i$, wherein $V_i$ is the working voltage reference of the i-th battery module 120a, $V_{NOR+}$ is the rated working voltage value of the DC bus 20 as well as the float charging voltage of the backup battery 130, $K_{SOCi}$ is the balance control coefficient of the i-th battery module 120a, $I_i$ is the current of the i-th battery module 120a, and i is a positive integer greater than or equal to 1.

In this embodiment, the main battery 120 in the energy storage system 100 includes a plurality of battery modules 120a. In the backup mode, i.e., when the main battery 120 is discharges or is charged, the controller in each battery modules 120a can make a corresponding control strategy based on the battery SOC thereof to achieve the effect of energy balance and maintain the stability of the system.

Figure 9A:
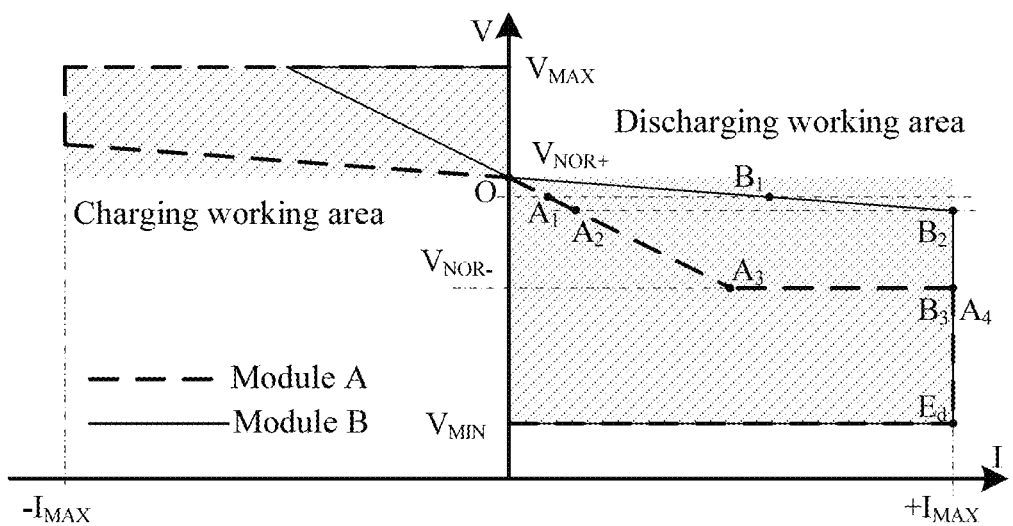
FIG. 9A to FIG. 9B are diagrams illustrating V/I working characteristic of a main battery configured with two battery modules in the energy storage system according to an embodiment of the present application.
Figure 9B:
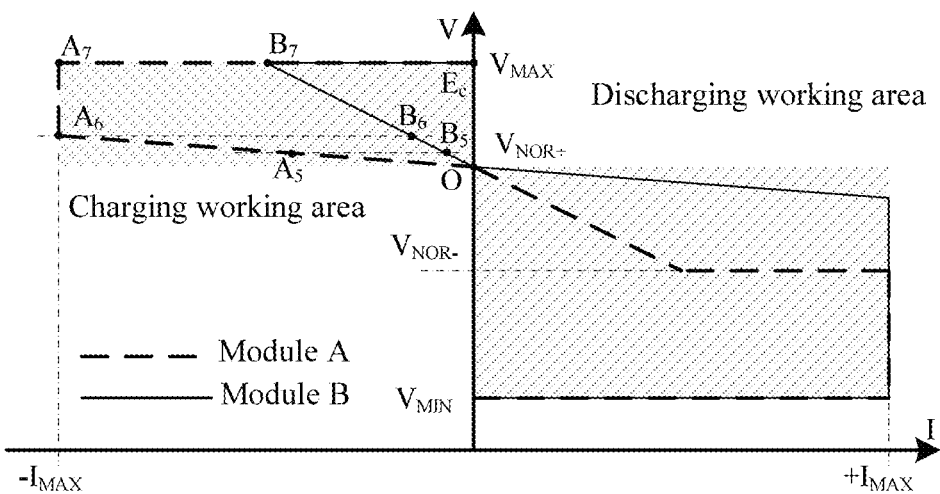

Please refer to FIG. 9A and 9B, which illustrate V/I working characteristic when the main battery 120 in the energy storage system 100 is configured with two battery modules, wherein the SOC of the module A is set to be smaller than the SOC of the module B during operation.

Under normal working conditions, the power supply device 110 outputs power at the rated working voltage $V_{NOR+}$, the backup battery 130 is in a float charge state, and the main battery 120 is in a standby mode at the working point O in the figure.

When the power supply device 110 stops supplying power, the voltage of the DC bus 20 is maintained by the backup battery 130 at the moment when the power supply device 110 stops working, and the backup battery 130 supplies power to the load 30. Due to the internal resistance of the battery or else, the voltage of the DC bus 20 is lower than the rated working voltage $V_{NOR+}$, and the main battery 120 is triggered to switch to the backup mode and starts to supply power to the load 30.

As the SOC of the module A and the SOC of the module B are different, working curves thereof are also different. At a certain moment, when the output power of the main battery 120 and the power of the load 30 are equal, the stable working points of the module A and the module B are at $A_1$ and $B_1$ respectively. If load 30 is relatively heavy, then the stable working points at this moment are at $A_2$ and $B_2$, and at the point $B_2$, the module B operates at the maximum current allowed by the hardware (i.e., the upper limit current shown in FIG. 8). If load 30 is further aggravated, then the stable working points at this moment are at $A_3$ and $B_3$, and at this point, the module A starts to operate at a limited voltage, and the output voltage of the module A is maintained at a lower limit voltage $V_{NOR-}$.

When the stable working points of the modules A and B are at $A_4$ and $B_3$ respectively, both the battery modules perform output at the maximum power. If the power of the load 30 is still greater than the output power of the main battery 120, then the backup battery 130 will participate in power supply. With the power consumption of the backup battery 130, the terminal voltage drops, and the working points of the modules A and B move to the point $E_d$. When the working points are at the point $E_d$, the discharge of both the main battery 120 and the backup battery 130 is stopped, and the energy storage system 100 shuts down.

As shown in FIG. 9B, if the power supply device 110 resumes its operation at any time in the stages A1, B1 to $E_d$, the working points will return to the working point O along the curves as the terminal voltage of the backup battery 130 rises, and the modules A and B will be charged gradually.

After the backup battery 130 is charged to the working point O by the power supply device 110 and the main battery 120, the modules A and B will be charged gradually. As the terminal voltage of the backup battery 130 rises, the working point of the module A with smaller SOC will shift along O, $A_5$, $A_6$ and $A_7$, and the module A will be charged at the maximum power at the working point $A_7$. The working point of the module B with larger SOC will shift along O, $B_5$, $B_6$ and $B_7$. As the SOC of modules A and B approaches 100% gradually, the working points are shifted from $A_7$ and $B_7$ to Ec respectively. When all the working points reach Ec, the charging of the modules A and B is completed and the main battery 120 is switched to standby mode.

When both the module A and the module B enter the standby mode, and the backup battery 130 is full-charged, the power supply device 110 adjusts the output voltage to the rated working voltage $V_{NOR+}$ and performs float charging on the backup battery 130, and the energy storage system 100 returns to the normal working condition.

Finally, it shall be noted that the above embodiments are only used to illustrate the technical solutions of the present application, and are not intended to limit the present application. Under the thought of the present application, the technical features in the above embodiments or different embodiments may also be combined, the steps may be implemented in any order, and there are many other variations in different aspects of the present application as described above, which are not provided in details for brevity. Although the present application has been described in detail with reference to the foregoing embodiments, those of ordinary skill in the art shall appreciate that, it is still possible to modify the technical solutions recorded in the foregoing embodiments or to substitute for some of the technical features equivalently. However, these modifications or substitutions do not make the essence of the corresponding technical solutions depart from the scope of the technical solutions of the embodiments of the present application.

What is claimed is:

1. A power supply method of an energy storage system, the energy storage system comprising a power supply device for supplying power to a DC bus, and a main battery and a backup battery connected to the DC bus in parallel, wherein the power supply method comprises:
    when the power supply device works normally, a load is powered and the backup battery is floatingly charged by the power supply device, and the main battery is in standby mode;
    when the power supply device stops supplying power, the load will be powered by the backup battery to maintaining the voltage of the DC bus, and meanwhile, the main battery will be triggered to switch from the standby mode to a backup mode to start supplying power to the load;
    when an output power of the main battery is equal to a power of the load, an output power of the backup battery is zero and the backup battery is in a bypass state;
    when a maximum output power of the main battery is less than the power of the load, the load will be powered by the main battery and the backup battery;
    when the power supply device resumes, the load will be powered by the power supply device together with the main battery, and meanwhile, the backup battery is charged by the power supply device and the main battery;
    when a voltage of the DC bus is higher than a rated working voltage, the load will be powered by the power supply device, and meanwhile, the backup battery and the main battery are charged by the power supply device;
    wherein the energy storage system further comprises a communication link for realizing communication between the power supply device and the main battery, and the power supply method further comprises:
    sending a scheduling command to the main battery by the power supply device so that the main battery is switched from the standby mode to a scheduling mode, and the main battery is charged/discharged according to the scheduling command;
    the main battery returns to the standby mode again after the main battery has discharged/been charged according to the scheduling command.

2. The power supply method according to claim 1, wherein the power supply method further comprises:
    after the charging of the backup battery and the main battery is completed, the voltage of the DC bus drops to the rated working voltage, the backup battery is floatingly charged by the power supply device, and the main battery is in the standby mode.

3. The power supply method according to claim 2, wherein the scheduling command comprises a discharging command and a charging command, and the step of sending the scheduling command to the main battery by the power supply device specifically comprises:
sending a discharging command to the main battery by the power supply device so that the main battery is discharged according to the discharging command, wherein the discharging command comprises any two of the following: a target SOC value, a target discharging rate, and a target discharging time; or
sending a charging command to the main battery by the power supply device so that the main battery is charged according to the charging command, wherein the charging command comprises any two of the following: a target SOC value, a target charging rate, and a target charging time.

4. The power supply method according to claim 2, wherein the power supply method further comprises:
when the communication between the main battery and the power supply device is abnormal, or when the communication between the main battery and the power supply device is normal but the voltage of the DC bus is lower than a preset trigger voltage, or when the main battery receives a forced switching command from the power supply device, the main battery is switched from the standby mode or the scheduling mode to the backup mode.

5. The power supply method according to claim 1, wherein,
the main battery comprises a plurality of battery modules, each battery modules comprises a cell unit, a battery management unit, a DC power conversion unit and a second communication interface, one terminal of the battery management unit is connected to the cell unit, the other terminal of the battery management unit is connected to the DC power conversion unit, both the battery management unit and the DC power conversion unit are connected to the second communication interface, meanwhile, the remaining battery modules communicate with each other through the second communication interface;
the DC power conversion unit is provided with a controller and a sampling circuit, the controller acquires transient SOC values of all the battery modules through the second communication interface, and acquires a current of the battery module through the corresponding sampling circuit, and according to the transient SOC values of all the battery modules and the current of the battery module in which it is located, determines a working voltage of the battery module in which it is located by calculating the working voltage reference;
when the working voltage reference value is higher than the lower limit voltage value, the controller controls the output voltage of the battery module where it is located to be the working voltage reference value; when the working voltage reference value is lower than the lower limit voltage value, the controller controls the output voltage of the battery module where it is located to be the lower limit voltage value.

6. The power supply method according to claim 5, wherein, the step of the controller determines a working voltage of the battery module in which it is located by calculating the working voltage reference according to the transient SOC values of all the battery modules and the current of the battery module in which it is located, specifically comprises:
determining a balance control coefficient $K_{SOC}$ of the battery module in which it is located according to the transient SOC values of all the battery modules, wherein the balance control coefficient $K_{SOC}$ is negatively correlated with the transient SOC value when the main battery supplies power, and negatively correlated with (1−transient SOC value) when the main battery is charged;
calculating the working voltage reference of the battery module in which it is located according to a formula $V_i = V_{NOR+} - K_{SOCi} \cdot I_i$, wherein $V_i$ is the working voltage reference of the i-th battery module, $V_{NOR+}$ is the rated working voltage value of the DC bus, $K_{SOCi}$ is the balance control coefficient of the i-th battery module, $I_i$ is the current of the i-th battery module, and i is a positive integer greater than or equal to 1.

7. An energy storage system, comprising a power supply device for supplying power to a DC bus, and a main battery and a backup battery connected to the DC bus in parallel;
when the power supply device works normally, a load is powered and the backup battery is floatingly charged by the power supply device and the main battery is in standby mode;
when the power supply device stops supplying power, the backup battery will be configured to supply power to the load to maintaining the voltage of the DC bus, and meanwhile, the main battery will be switched from the standby mode to a backup mode to start supplying power to the load;
when an output power of the main battery is equal to a power of the load, an output power of the backup battery is zero and the backup battery is in a bypass state;
when a maximum output power of the main battery is less than the power of the load, the backup battery and the main battery together supply power to the load;
when the power supply device resumes, the power supply device and the main battery together supply power to the load, and meanwhile, the backup battery is charged by the power supply device and the main battery;
when a voltage of the DC bus is higher than a rated working voltage, the power supply device supplies power to the load, and meanwhile, the backup battery and the main battery being charged by the power supply device;
wherein the energy storage system further comprises a communication link for realizing communication between the power supply device and the main battery;
the power supply device is further configured to send a scheduling command to the main battery so that the main battery is switched from the standby mode to a scheduling mode, and the main battery is further configured to discharge/be charged according to the scheduling command;
the main battery returns to standby mode after the main battery has discharged/been charged according to the scheduling command.

8. The energy storage system according to claim 7, wherein,
after the charging of the backup battery and the main battery is completed, the voltage of the DC bus drops to the rated working voltage, the backup battery is floatingly charged by the power supply device, and the main battery is in the standby mode.

9. The energy storage system according to claim 8, wherein the scheduling command comprises a discharging command and a charging command, and the operation of sending the scheduling command to the main battery by the power supply device specifically comprises:

sending a discharging command to the main battery by the power supply device so that the main battery is discharged according to the discharging command, wherein the discharging command comprises any two of the following: a target SOC value, a target discharging rate, and a target discharging time; or sending a charging command to the main battery by the power supply device so that the main battery is charged according to the charging command, wherein the charging command comprises any two of the following: a target SOC value, a target charging rate, and a target charging time.

10. The energy storage system according to claim 8, wherein,
when the communication between the main battery and the power supply device is abnormal, or when the communication between the main battery and the power supply device is normal but the voltage of the DC bus is lower than a preset trigger voltage, or when the main battery receives a forced switching command from the power supply device, the main battery is switched from the standby mode or the scheduling mode to the backup mode.

11. The energy storage system according to claim 7, wherein,
the main battery comprises a plurality of battery modules, each battery modules comprises a cell unit, a battery management unit, a DC power conversion unit and a second communication interface, one terminal of the battery management unit is connected to the cell unit, the other terminal of the battery management unit is connected to the DC power conversion unit, both the battery management unit and the DC power conversion unit are connected to the second communication interface, meanwhile, the remaining battery modules communicate with each other through the second communication interface;

the DC power conversion unit is provided with a controller and a sampling circuit, the controller acquires transient SOC values of all the battery modules through the second communication interface, and acquires a current of the battery module through the corresponding sampling circuit, and according to the transient SOC values of all the battery modules and the current of the battery module in which it is located, determines a working voltage of the battery module in which it is located by calculating the working voltage reference;

when the working voltage reference value is higher than the lower limit voltage value, the controller controls the output voltage of the battery module where it is located to be the working voltage reference value; when the working voltage reference value is lower than the lower limit voltage value, the controller controls the output voltage of the battery module where it is located to be the lower limit voltage value.

12. The energy storage system according to claim 11, wherein,
according to the acquired transient SOC values of all the battery modules and the current of the battery module in which it is located, the controller determines the working voltage of the battery module in which it is located by calculating the working voltage reference, specifically comprises:

determining a balance control coefficient $K_{SOC}$ of the battery modules in which it is located according to the transient SOC values of all the battery modules, wherein the balance control coefficient $K_{SOC}$ is negatively correlated with the transient SOC value when the main battery supplies power, and negatively correlated with (1−transient SOC value) when the main battery is charged;

calculating the working voltage reference of the battery module in which it is located according to the formula $V_i = V_{NOR+} - K_{SOCi} \cdot I_i$, wherein $V_i$ is the working voltage reference of the i-th battery module, $V_{NOR+}$ is the rated working voltage value of the DC bus, $K_{SOCi}$ is the balance control coefficient of the i-th battery module, Ii is the current of the i-th battery module, and i is a positive integer greater than or equal to 1.

13. The energy storage system according to claim 7, wherein,
the main battery is a lithium-ion battery, and the backup battery is a lead-acid storage battery or a supercapacitor.

* * * * *